(12) United States Patent
Furlanetto et al.

(10) Patent No.: US 8,261,566 B2
(45) Date of Patent: Sep. 11, 2012

(54) REFRIGERATION APPARATUS WITH ADAPTIVELY CONTROLLED OPERATION

(75) Inventors: Riccardo Furlanetto, Musile di Piave (IT); Daniele Mari, Trieste (IT); Fabio Sinatra, Cervignano del Friuli (IT)

(73) Assignee: Electrolux Professional SpA, Pordenone (IT)

(*) Notice: Subject to any disclaimer, the term of this patent is extended or adjusted under 35 U.S.C. 154(b) by 847 days.

(21) Appl. No.: 11/391,221

(22) Filed: Mar. 29, 2006

(65) Prior Publication Data
US 2006/0242975 A1    Nov. 2, 2006

(30) Foreign Application Priority Data
Apr. 29, 2005  (IT) .................................. 2005A0026

(51) Int. Cl.
*F25D 17/08* (2006.01)
*F25B 49/00* (2006.01)
(52) U.S. Cl. .......................................... 62/157; 62/126
(58) Field of Classification Search ............... 62/208, 62/209, 157, 229; 99/326; 219/681; 426/523
See application file for complete search history.

(56) References Cited

U.S. PATENT DOCUMENTS

| | | | | |
|---|---|---|---|---|
| 4,416,119 A | * | 11/1983 | Wilson et al. ................... | 62/149 |
| 4,697,429 A | * | 10/1987 | Chandler et al. ................ | 62/203 |
| 4,834,169 A | * | 5/1989 | Tershak et al. ................. | 165/233 |
| 5,460,006 A | * | 10/1995 | Torimitsu ........................ | 62/127 |
| 5,826,432 A | * | 10/1998 | Ledbetter ....................... | 62/196.4 |
| 5,896,748 A | * | 4/1999 | Park ............................... | 62/179 |
| 5,931,010 A | * | 8/1999 | Kim ............................... | 62/157 |
| 6,311,509 B1 | * | 11/2001 | Cartwright et al. ............. | 62/213 |
| 6,550,259 B2 | * | 4/2003 | Cartwright et al. ............. | 62/126 |
| 6,850,861 B1 | * | 2/2005 | Faiola et al. ................... | 702/130 |
| 2003/0233173 A1 | * | 12/2003 | Stewart ........................... | 700/299 |
| 2005/0115259 A1 | * | 6/2005 | Ergarac et al. ................. | 62/228.1 |

* cited by examiner

*Primary Examiner* — Frantz Jules
*Assistant Examiner* — Emmanuel Duke
(74) *Attorney, Agent, or Firm* — Wenderoth, Lind & Ponack, L.L.P.

(57) ABSTRACT

Method for chilling foodstuffs contained in a chilling compartment at controllable temperature, and adapted to perform according to an operating procedure that includes continuously pulling down a temperature inside the foodstuff to be chilled, until a pre-set value ($T_f$) is eventually reached, provided that the temperature inside the chilling compartment is lower than a pre-set value, and the temperature at the core of the foodstuff is lower than a pre-set value. In addition, before the process is allowed to move on to a final temperature pull-down step, further conditions are defined to ensure that the temperature pull-down pattern and rate inside the foodstuff are complying with the requirements set forth by applicable standards.

5 Claims, 5 Drawing Sheets

REFRIGERATION APPARATUS WITH ADAPTIVELY CONTROLLED OPERATION

BACKGROUND OF THE INVENTION

1. Field of the Invention

The present invention refers to an improved kind of refrigeration apparatus provided with means for carrying out a fresh-food refrigeration program, which is caused to automatically vary in accordance with the nature of the food products to be deep-frozen. In particular, the present invention is adapted to identify the nature of the freezing load based on the temperature detected inside the refrigeration compartment in response to the temperature detected by an appropriate device at the core of the freezing load itself during the first phases of the freezing process, as well as to adapt the phases of the freezing process in accordance with the temperature response.

2. Description of the Related Art

Although reference will solely be made to a refrigeration apparatus of the kind intended for use in food-service operations, and provided with a single refrigeration compartment, throughout the following description, what is going to be explained and illustrated hereinbelow shall be appreciated to readily and similarly apply to combination refrigerator-freezer appliances or appliances provided with a plurality of compartments at different temperatures.

In professional food-service operations, such as restaurants, public houses, and the like, a large use is generally made of considerable amounts of products that must be deep-frozen and kept stored under freezing conditions for relatively long periods of time. However, since these food products in this particular field of application are usually processed in volumes and amounts that are certainly far more substantial than they are at home, it ensues that the deep-freezers that are capable of handling such considerable food volumes, are not generally found to be capable of equally ensuring any adequate refrigeration capacity in view of deep-freezing the food products within the maximum time allowances provided for by the applicable standard regulations.

It would of course be fully possible for large-volume deep-freezers to be provided so as to also feature an adequate refrigeration capacity; such appliances would however prove expensive to quite an unacceptable extent. In view of solving this problem, use is therefore largely made in the food-service industry of deep-freezing appliances of a particular kind, i.e. the so-called chillers, which are provided with a high freezing capacity, actually, but are relatively limited in the useful freezing volumes they generally offer. The use of these chillers is practically aimed at pulling down the temperature of the food products placed thereinside in a very quick manner, so as to have the food products frozen well within the time allowances provided for and in the proper ways as required by the standard regulations. Upon having so been deep-frozen in the chillers, the just frozen food products are removed from the same chillers and placed in the low-temperature storage compartments of regular freezers which, while affording large storage volumes, are in this way not required to provide any particularly high freezing capacity, since the food products stored therein are already in a deep-frozen state.

Incidentally, these chillers are also used to abruptly pull down the temperature of food products, which are either fresh food items or food items that have been just cooked, which do not require being deep-frozen, but just cooled down in a quick manner in view of being able to be preserved for just a few days.

When used to this particular purpose, however, these chillers have a major drawback—largely known as such in the art—lying in the fact that—owing to the required temperature pull-down rapidity—the quick temperature decrease effect that they generally bring about inside, i.e. at the core of the food products themselves, and which is measured with a so-called core-temperature probe in the form of a special needle-like stick carrying a temperature sensor at the tip thereof for introduction in the food product, causes the temperature in the storage compartment to equally decrease to very low values in a correspondingly quick manner. Such an occurrence comes to exist even if the final temperature of the food product—as measured by the core-temperature probe—does in no case decrease below zero, since the cooling-down process is stopped before this can happen.

However, owing exactly to its being pulled down in a quick manner to a very low value, the temperature prevailing in the chilling compartment gives rise to the occurrence of the well-known surface "blackening" effect, in which the surface or outside layers of the food products are practically frozen down, even if the core temperature thereof remains at clearly higher values. This freezing effect is due to the fact that, owing to the temperature in the chilling compartment being very low, the surface layers of the food products placed therein are ultimately conditioned by such temperature since they have quite limited a heat capacity towards the outside and, moreover, act as heat insulators towards the innermost layers of the same food products, which of course keep at quite higher a temperature value while undergoing a much slower temperature pull-down process that is anyway interrupted well in advance of such inner layers being able to freeze.

As this can readily be appreciated, such negative surface "blackening" occurrence has a rather spoiling effect of the food products affected and tends to show up particularly in food products with a high water content or a smaller heat capacity—and which are therefore particularly delicate—as this is the case with almost all fresh vegetables; in addition, in the case of many sweet-meats and articles of confectionary in general there frequently forms a surface layer of frost or ice that, when eventually thawing out, tends to produce a "wash-out" effect and, as a result, spoil the surface layers of such products to the obvious detriment of both the quality and the appearance thereof.

BRIEF SUMMARY OF THE INVENTION

In view of the above, it would therefore be desirable, and it is actually a main object of the present invention to provide a refrigeration apparatus and a method of operation thereof, which are adapted to fully automatically detect and identify the state of the load of food products to cool down by appropriately processing the data concerning the temperatures in the chilling compartment and at the core of the food products, and to carry out a cooling-down process properly adapted to the thus detected and identified state of the chilling load.

According to the present invention, these aims, along with further ones that will become apparent from the following disclosure, are reached in a refrigeration apparatus incorporating the features as defined and recited in the appended claims.

BRIEF DESCRIPTION OF THE DRAWINGS

Features and advantages of the present invention will be more readily understood from the description that is given below way of non-limiting example with reference to the accompanying drawings, in which.

Figure 2:
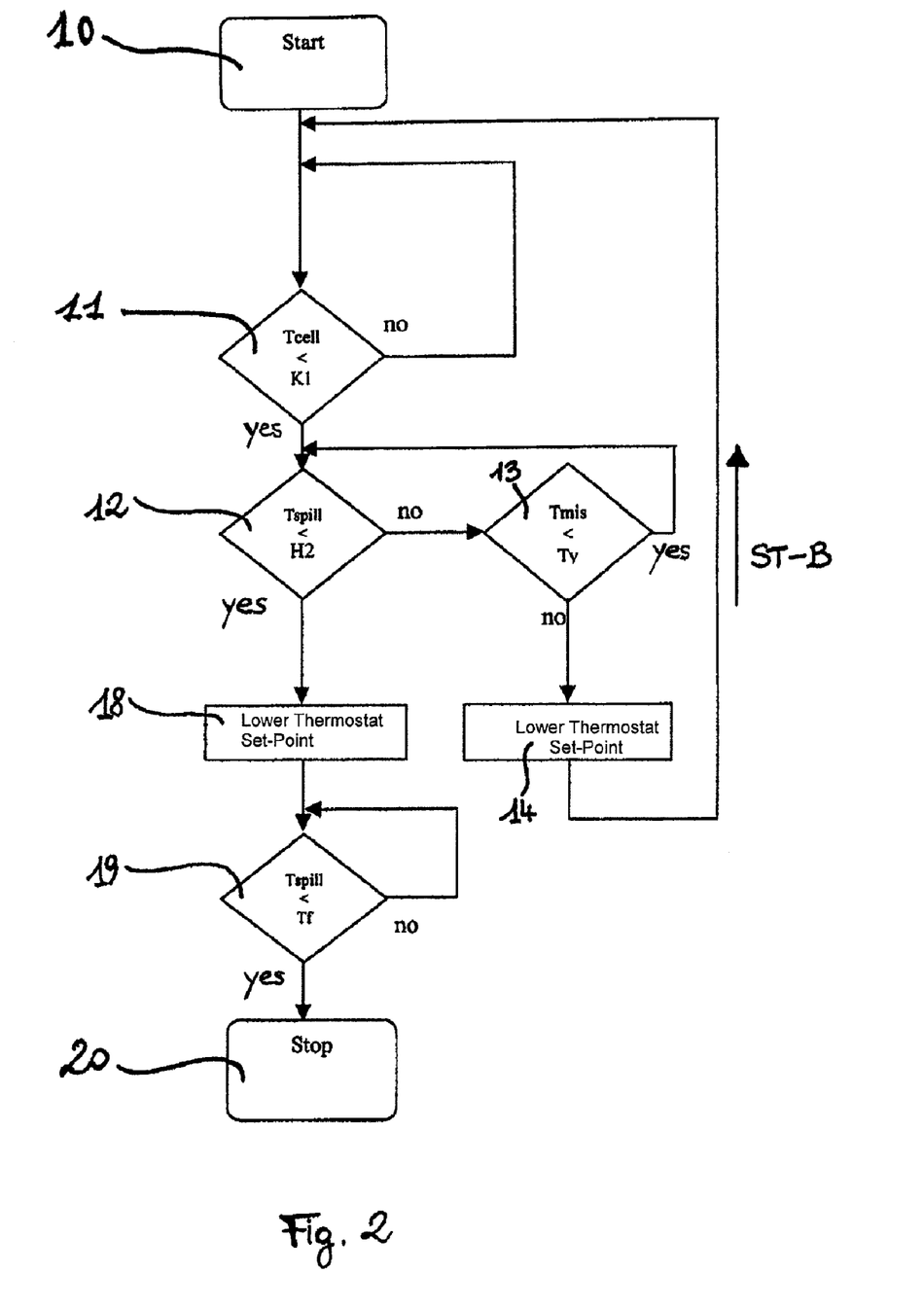
FIG. 2 is a symbolical flow chart of the logical and operating modes and steps of a method according to the present invention.

With reference to the flow-chart in FIG. 2, the method according to the invention starts from block 10, at which the compartment containing the foodstuff to be chilled starts to be cooled down. The actual cooling process is performed with the aid of means that are generally known as such in the art, eg. with the use of a refrigeration and/or freezing appliance of a known kind, duly provided with control and operating means as generally known as such in the art, wherein the present invention only refers to the ways and modes of operation of the control and operating means.

Upon starting, the method continues by going through some initial and intermediate steps, until it eventually reaches blocks 19 and 20, which represent the final phase, i.e. the phase at which the method comes to an end owing to the temperature at the core of the foodstuff having reached down to a pre-set value $T_f$.

This temperature at the core of the foodstuff can be detected by any appropriate means adapted to sense and output a univocal information about the temperature being reached at the core of the foodstuff to be chilled. In general, use is made to this purpose of a core-temperature probe in the form of a special needle-like stick carrying a temperature sensor of a generally known kind at the tip thereof for introduction in the food product.

While reference will generally be made to such kind of core-temperature probe device throughout the following description, any other appropriate means, such as an infrared detector, may in fact be used within the scope of the present invention.

The first step encountered after the actual start point of the method is represented by block 11, in which the room temperature inside the chilling compartment is measured to find whether such temperature is lower than a pre-defined value K1.

Such temperature K1 is defined as the temperature whose value is slightly higher—by a pre-defined extent—than the set-point value, i.e. the value at which a thermostat of a generally known kind, provided to measure the temperature inside the chilling compartment, would trip to interrupt the cooling-down process.

This initial set-point value may take different values (i.e. the thermostat may be set at different temperatures), as this shall be explained in greater detail further on in the description of the method. In the initial phase, this value is assumed to be at a defined value SP-A, thereby automatically defining also the value of K1 lying at a definite temperature above the temperature of the initial set point ST-A.

The purpose of the comparison performed at block 11 is to adjust the temperature inside the chilling compartment and, namely, to cause the temperature to decrease to progressively lower values, in accordance with the course of the temperature detected by the core-temperature probe.

As long as the temperature in the chilling compartment is not found to be lower than the pre-set temperature K1, the cooling-down process is allowed to progress.

When such temperature is eventually found to have decreased to such an extent as to reach the temperature value K1, the comparison of the temperature detected by the core-temperature probe with a pre-determined value H2 is performed at block 12.

If the temperature detected by the core-temperature probe is found to be lower than the value H2, then the cooling-down process is allowed to go on and the method moves on to block 18, in which the thermostat tripping, i.e. set-point value is lowered to a pre-established value so as to enable a lower temperature than the desired final temperature $T_f$ to be reached at the core of the foodstuff.

Thereupon, the method moves on to the blocks 19 and 20; a final reference value of the temperature $T_f$ is compared to a temperature $T_{spill}$ measured by the core-temperature probe, when the such temperature is detected by the probe as having been reached, the cooling-down process is automatically interrupted and the methods comes to an end.

The purpose of the comparison performed at block 12 is to ensure that cooling has sufficiently progressed also inside the foodstuff so as to avoid jeopardizing the qualitative result during the final cooling-down phase to the lowest allowable final temperature. Should the temperature be still at quite an elevated value, the result would be an excessive divergence between the instant temperature inside the foodstuff and the temperature to which the chilling compartment is being rapidly brought, thereby exposing the outermost layers of the foodstuff to serious "blackening" risks.

In other words, the comparison at block 12 is carried out in order to ensure a sufficient "downward levelling-off" of the temperature at the core of the foodstuff to the value of H2, because, if such downward levelling of the core temperature occurs, and since the outside layers of the foodstuff are in turn conditioned by the temperature of the air that is already at a controllably low value, this means that there is just a modest temperature difference between the inside and the outside layers of the foodstuff, so that a further temperature decrease in the chilling compartment would ultimately not bring about any of the problems that have to be desirably avoided.

As far as the value of H2 is concerned, this can be identified experimentally based on the final qualitative results that are to be desirably obtained and—of course—in accordance with the type of foodstuff being handled.

The desired value of H2 may therefore be set once and for all, but it may preferably be an "input" to be selected and entered by the operator with conventional means, and which is stored and used by the afore-mentioned control and operating means of the apparatus governing the inventive method for performing the above-described cooling process.

If the temperature measured by the core-temperature probe ($T_{spill}$) is on the contrary found to be above the value H2, the cooling process is allowed to go further on and the method reaches block 13, where a comparison is made of the value of the core temperature measured by the $T_{mis}$ probe with a value $T_y$ that is calculated as described below.

Figure 3:
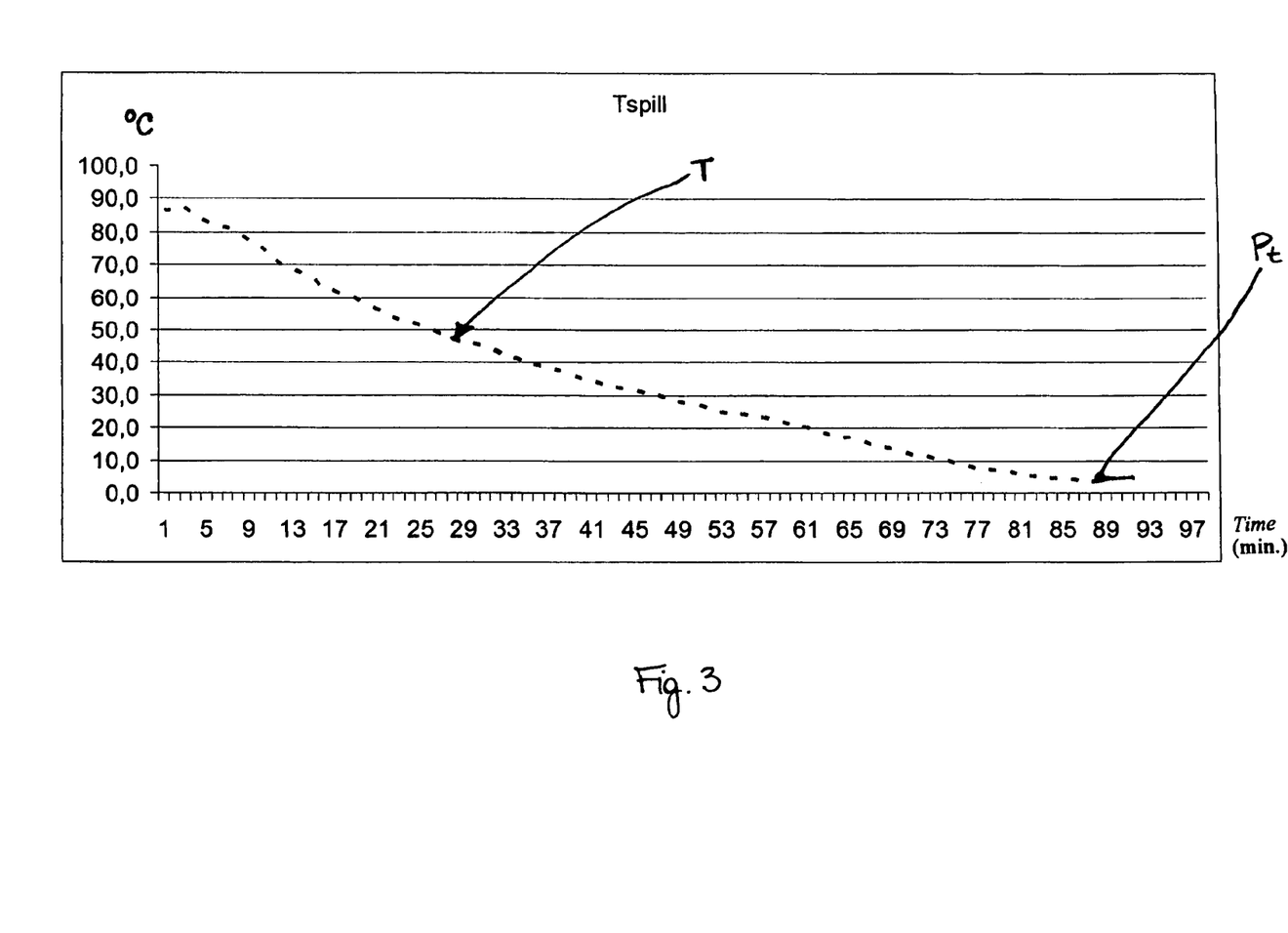
FIG. 3 is a diagrammatical view of a graph showing the curve of the real temperature trend detected at the core of a foodstuff undergoing a chilling process in a chilling compartment where the temperature is kept at a constant value $T_c$.

With reference to FIG. 3, in the course of extensive experimental work done on cooling processes it has been found that the trend of the cooling curve inside a foodstuff may be represented with a polynomial of the following type:

$$T = a \cdot x^n + b \cdot x^{n-1} + c \cdot x^{n-2} \ldots$$

In particular, when the temperature of the chilling compartment, in which the foodstuff has been placed, is substantially constant, the temperature decrease or pull-down curve takes the form of a sensibly parabolic curve of the following type:

$$T = a \cdot x^2 + bx + c \qquad (A)$$

wherein x is the time elapsed from the beginning of the cooling process, which, in the case being considered, coincides with the block 10 in the diagram.

Furthermore, the vertex of the parabola is identified to lie at the point of lowest temperature $P_t$ at the end of the cooling process.

Therefore, to the purposes of the present invention, the pattern represented by a parabolic curve is assumed to represent the trend of the temperature inside a foodstuff, when the latter undergoes cooling in a compartment that is kept at a constant temperature.

This assumption therefore constitutes a basic element of the present invention.

Currently applying standard regulations concerning food refrigeration processes, in particular the most important ones among them, i.e. the French, the British and the US standards, call for the cooling process to be completed within well-defined longest allowable time intervals, mainly in view of preventing the foodstuffs from suffering excessive deterioration due to excessively long cooling.

More specifically, the initial and final temperatures, along with the respective cooling time limits as provided for by the three above-cited standards, are shown in the following table:

| Standard | Initial temperature, °C. | Final temperature, °C. | Time, min. |
|---|---|---|---|
| UK | 70 | 3 | 90 |
| NF | 63 | 10 | 110 |
| NSF | 64 | 4 | 240 |

Figure 4:
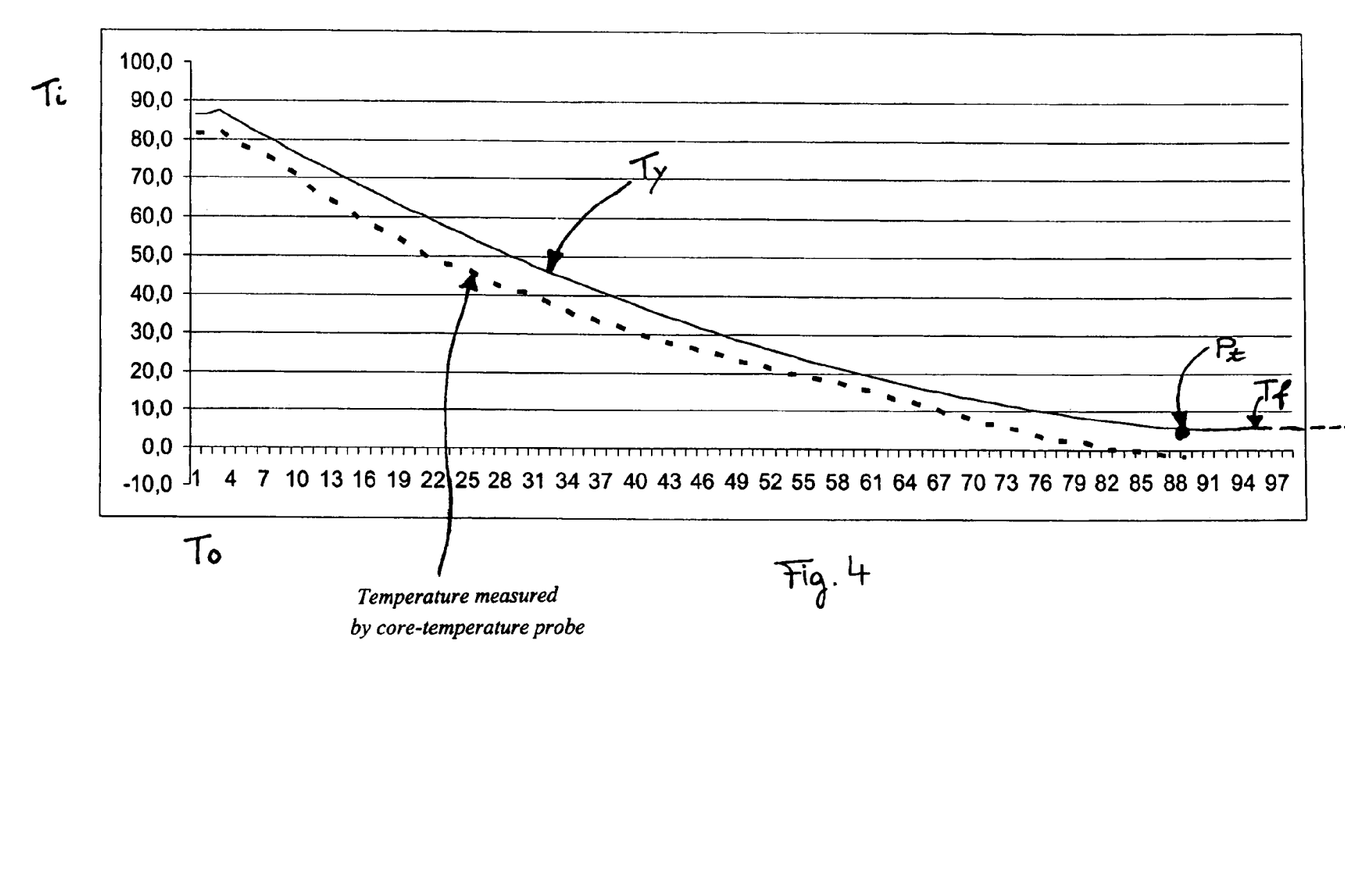
FIG. 4 shows a similar curve as above, as compared with the curve of the trend versus time of the maximum temperature allowed by reference standard regulations, when the initial temperature $T_i$ is exactly equal to the value of the initial temperature as defined by the standard regulations.

If the case is now considered, in which the actual initial temperature inside the foodstuff to be chilled is equal to the initial temperature considered in the particular standard used as a reference for the cooling process, this practically means that, with reference to FIG. 4, if at the initial instant $I_0$ the process starts from an initial temperature $T_i$ to end as soon as a final temperature $T_f$ is eventually reached, wherein the two extreme temperatures are defined by each one of the above-cited standards, then—considering the parabolic pattern (curve C) of the general trend of the temperature at the core of the foodstuff as defined above—the curve R of the actual temperature measured at the core of the foodstuff shall turn out as falling within the area below the theoretical maximum allowable curve C.

Going back to the afore-noted formula (A), for the relation representing the theoretical maximum allowable curve C to be capable of being used, it is obviously necessary for the numerical values of the three parameters a, b and c to be known.

The value of the parameter c is readily identified, since it is clearly the initial value of the temperature inside the foodstuff (x=0).

As far as the identification of the other parameters a and b is concerned, the related values are found in the manner described below.

Known from mathematics is the fact that in a parabolic function such as:

$$T = a \cdot x^2 + b \cdot x + c$$

the abscissa of the vertex is found with:

$$x_v = \frac{-b}{2a}$$

and therefore is $$\frac{-b}{2a} = N1$$

wherein the value N1 is known, since it corresponds to the time limit provided for by the standard for the cooling process to come to an end.

The ordinate of the vertex is found with:

$$Y = \frac{+b^2 - 4ac}{4a}$$

and therefore is $$\frac{b^2 - 4ac}{4a} = N2$$

wherein the value N2 is known, since it corresponds to the temperature provided for by the standard, which has to be reached at the end of the cooling time as defined above.

In practice, what is obtained is a system of two linear equations in two variables a and b.

The solution is therefore readily found, thereby ultimately identifying the parabolic relation that represents the allowed trend of the chilling process as provided for and defined by the particular standard regulations used as a reference.

It can therefore be readily and clearly appreciated that—for each particular standard used as a reference—the possibility is given for a respective parabolic function $T_y$ to be defined, having its vertex at the point $P_t$ of lowest temperature $T_f$, which represents the allowed temperature trend during the respective chilling process.

As a result, the value of $T_y$ calculated in this way on an instant-by-instant basis, represents the maximum temperature value that shall not be exceeded by the temperature being measured by the core-temperature probe for the standard provisions to be duly complied with.

Going back to block 13 in the diagram, if the temperature measured by the core-temperature probe is detected to be lower than the value $T_y$ calculated in the above-described way, this means that the standard provisions are being fully complied with, i.e. the temperature is decreasing at a sufficiently quick rate, even if it has not yet reached any adequately low value for the final cooling phase of the process to be started.

Therefore, the cooling process is allowed to go on and the logic flow returns to block 12 for the temperature detected by the core-temperature probe to be measured and compared on a continuous basis.

If the temperature measured by the core-temperature probe is on the contrary not found to be lower than the value $T_y$ at block 13, this means that the standard provisions are not being complied with either, i.e. the temperature is not decreasing at any sufficiently quick rate.

Figure 5:
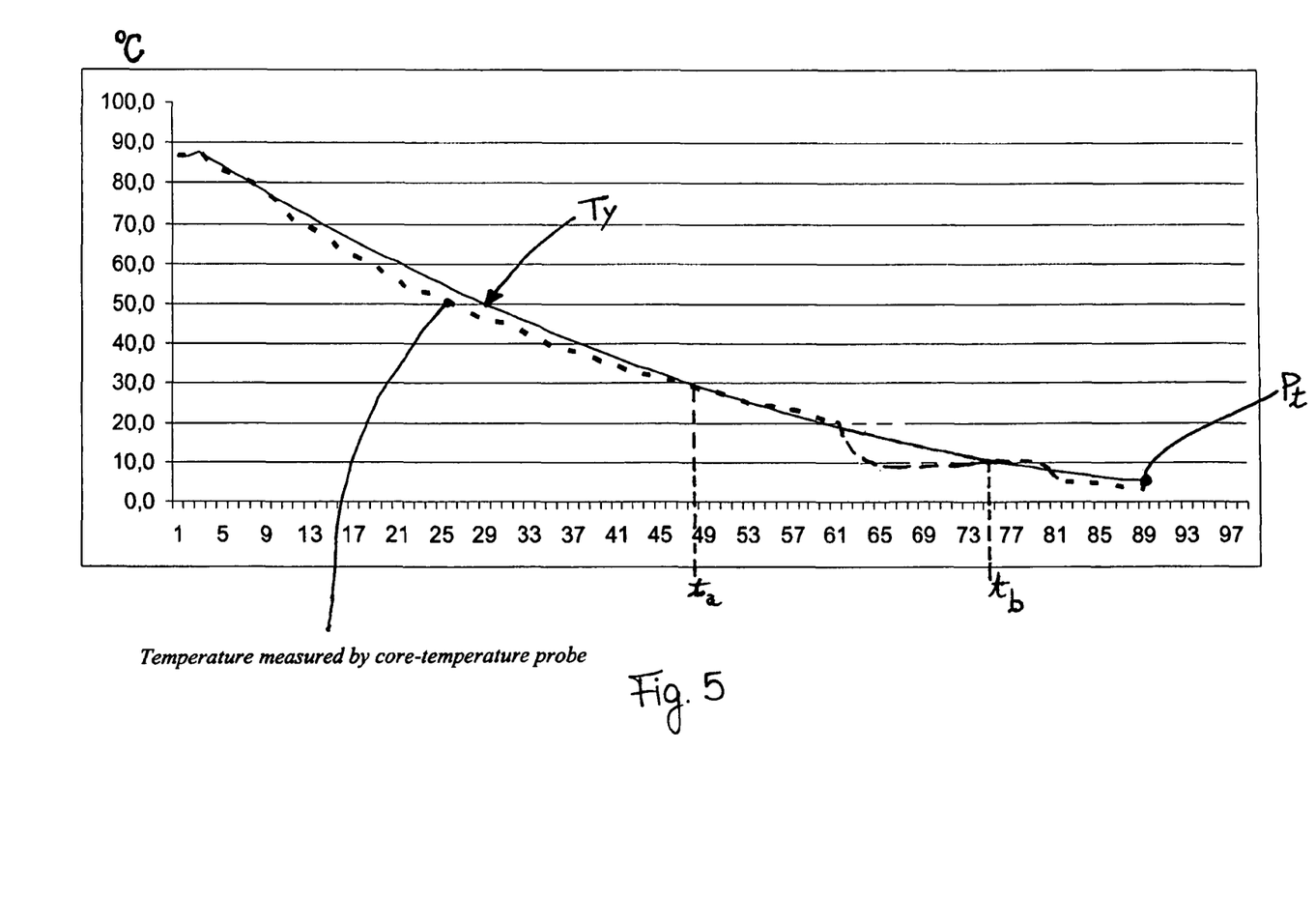
FIG. 5 shows a similar curve as above, but referred to a real initial temperature $T_{ir}$ at the core of the foodstuff, which is different from the value of the initial temperature $T_i$ as provided for by the reference standard regulations, as compared with the curve of the trend versus time of the maximum temperature allowed by the standard regulations, when rectified to allow for the real initial temperature $T_{ir}$.

In this case it can be noticed how the curve R in the example illustrated in FIG. 5 reaches, i.e. meets with the curve C at some instants, e.g. the instants $t_a$ and $t_b$.

In order to do away with such problem, the need therefore arises for the pull-down rate of the temperature to be increased as soon as such condition comes to occur. To this purpose, the logic process moves therefore on to block 14, in which a second set point SP-B—the value of which will of course be lower than the value of the first set point SP-A—is selected and delivered as an input to the control means governing the cooling process.

Thereupon, the cooling process is started again according to the above-described method from the beginning, i.e. from block 11 in the diagram, however with the novel and "colder" set point SP-B.

The procedure shall be repeated automatically whenever the curve R meets with and moves beyond the reference curve C, wherein meeting such requirement is ensured by the closed loop comprising the logic blocks 11, 12, 13 and 14.

It can be readily appreciated that the method that is so provided to be able to run in this way through the logic blocks 11, 12, 13, 14, 11, etc. . . . iteratively, cannot obviously last indefinitely; to this purpose, therefore, the successively selected set points SP-A, SP-B, SP-C, etc., which enter progressively lower values of target-temperature in the chilling compartment, shall be suitably selected as lying sufficiently spaced from each other in the temperature values thereof, and shall further be adequately limited in number, so that at a certain point the temperature detected by the core-temperature probe at block 12 turns with certainty out as being sufficiently low to allow the method to progress towards blocks 19 and 20, i.e. the final cooling phase of the process.

The selection of the pre-set temperature values of the set points can most appropriately be left to the judgment of those skilled in the art when determining and establishing the parameters and instructions comprised in the inventive method.

As this has been clearly pointed out, what has been described above refers to the case in which the actual temperature at the core of the foodstuff is exactly equal to the initial temperature $T_i$ defined by the standards selected as a reference.

Such circumstance, however, is rather theoretical, and in fact tends to occur quite seldom, since it can be reasonably assumed that, in general, the initial temperature of the foodstuff will be a random one, i.e. rather fortuitous.

In this general case, while it is obviously still possible for a parabolic relation to be used to represent the temperature pattern inside the foodstuff, such relation would however require being appropriately "rectified" in accordance with the actual initial temperature of the same foodstuff.

It has also been found that, with different values of the initial temperature, the temperature decrease rate—i.e. the relative foodstuff temperature pull-down rate versus time—follows a substantially similar pattern and depends on the value of the afore-identified value of the coefficient a.

It has in fact been found that the value of the coefficient a applies to all cases, regardless of the initial temperature coinciding with the standard value or not.

Furthermore, the value of the coefficient c is still and always known, since it practically is nothing else but the initial temperature, which is known since readily measured.

Therefore, if the measured value of c is entered along with the value of a—which, as discussed hereinbefore, is calculated and identified once and for all—in the afore-considered relation:

$$\frac{b^2 - 4ac}{4a} = N2$$

the still missing and, therefore, unknown value of b is obtained, so as to be able to define the relation of the parabolic curve representing the allowable temperature pull-down pattern starting from the actual initial temperature.

This just found relation is at this point used to identify—on an instant-by-instant basis—the limiting value of $T_y$, exactly in the same way as in the afore-considered case, and the method progresses exactly in the same way as already described with reference to the logic block 13 in the diagram, wherein the sole difference is the relation identifying the value of $T_y$, which—as discussed above—varies each time depending on the value of c, i.e. the value of the initial temperature.

Briefly stated, the method can therefore be considered as including a step in which the temperature at the core of the foodstuff is compared with a relation delivering a limiting value $T_y$ in accordance with the actual initial temperature thereof.

Moreover, depending on to the standard regulations selected for the chilling process to be performed in compliance with, a specific relation is used, which is defined in an once-and-for-all basis, in accordance with the value of the coefficient a that is established by and specific to each standard, and the value of c that is representative of the initial temperature.

Figure 1:
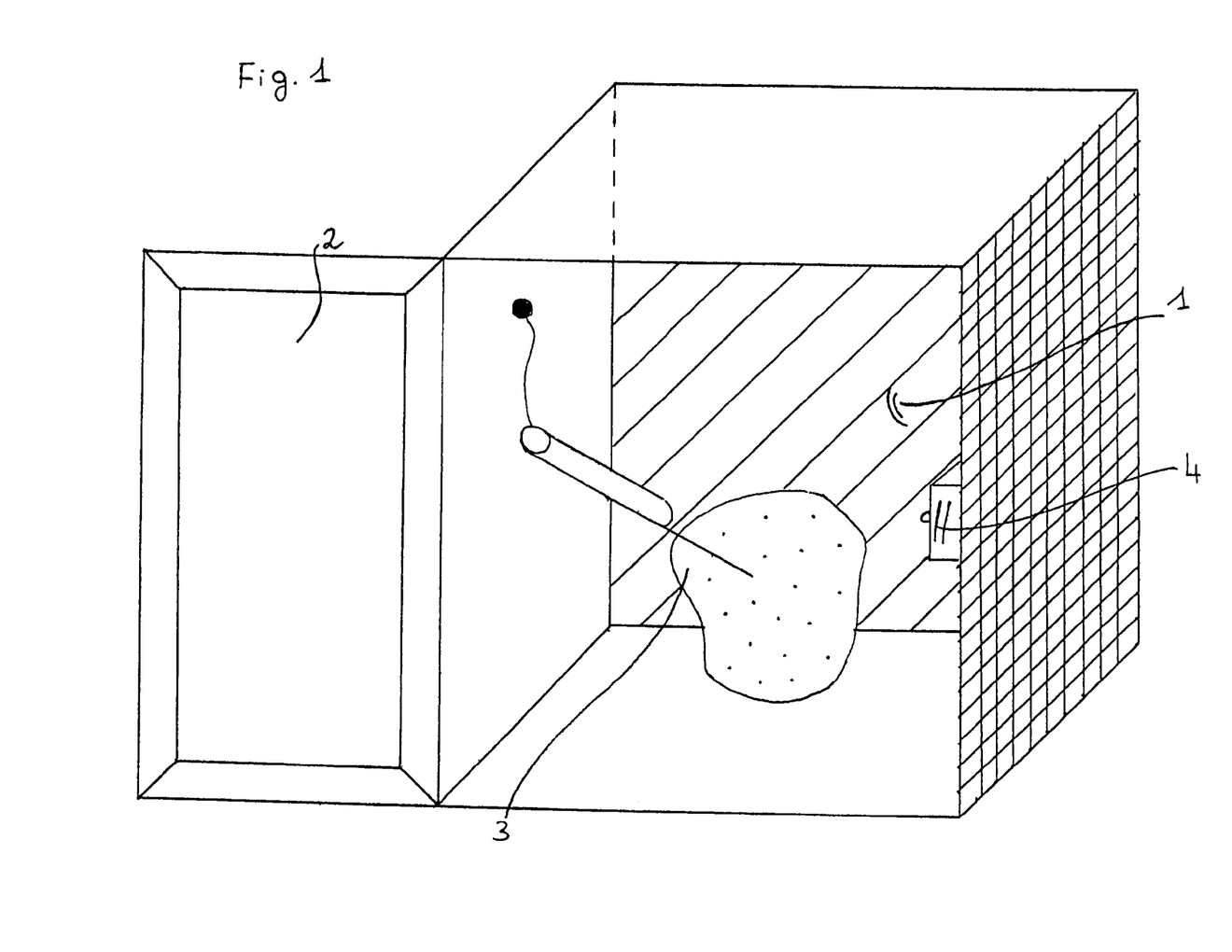
FIG. 1 is a symbolical front view of a refrigeration apparatus according to the present invention.

As far as the inventive refrigeration apparatus itself is concerned, this is a normal appliance comprised of a refrigerating, i.e. chilling compartment 1, access into which can be gained through a door 2. For determining the temperature inside, i.e. at the core of the foodstuff there is provided a first temperature sensor 3 of a conventional kind, e.g. in the form of a needle-like core-temperature probe of a largely known type adapted to be introduced in the foodstuff, connected to a control unit of a kind generally known as such in the art (not shown in the Figure), but adapted to enable the afore-described method to be performed.

Connected to such control unit there is also a second temperature sensor 4, which is adapted to measure the temperature inside the chilling compartment.

Furthermore, associated to the control unit there are of course an appropriate selector means adapted to enable the operator to select the reference standard according to which the chilling process has to be carried out.

To this control unit there can furthermore be delivered—for them to be stored and used there—also the constant parameters that are used in the afore-described processing steps, such as the values of K1, H2, the values of a of the relation (A), the set-point values, and the value of $T_f$, wherein these values may of course either be selected totally or partly when the afore-described method is going to be used or may be permanently stored from the beginning in the control and operating means.

It should therefore be noticed that the sole difference existing between the inventive apparatus and an apparatus according to the prior art lies in the method according to which the cooling process is performed and, therefore, in the nature of the instructions and data entered or existing in the control, operating, storage and processing means.

Furthermore, it will at this point be readily appreciated that—in view of chilling a foodstuff—an operator will no longer need to select and enter the kind of foodstuff to be handled and then watch the course of the temperature inside the same foodstuff. All he/she has to do is just enter an information that a chilling program is requested, and indicate the standard according to which the program has to be carried out, and the control means will automatically provide for all required control and operating steps and functions to be duly performed, without the same operator having to step-in in the process until chilling is completed.

The invention claimed is:

1. A method of chilling foodstuff contained in a chilling compartment by pulling down a temperature inside of the foodstuff to be chilled, the method comprising:
   a first step of pulling down the temperature inside of the chilling compartment until the temperature inside of the chilling compartment is lower than a first pre-set value (K1);
   a second step of, after the temperature inside of the chilling compartment is lower than the first pre-set value (K1), continuing to pull down the temperature inside of the chilling compartment;
   a third step of detecting a temperature at a core of the foodstuff to be chilled;
   a fourth step of comparing the detected temperature at the core of the foodstuff to be chilled with a second pre-set value (H2);
   a fifth step of, when the detected temperature at the core of the foodstuff is lower than the second pre-set value (H2), continuing to pull down the temperature inside of the chilling compartment until the detected temperature at the core of the foodstuff reaches a third pre-set value ($T_f$) that is lower than the second pre-set value (H2);
   a sixth step of, when the detected temperature at the core of the foodstuff is higher than the second pre-set value (H2), comparing the detected temperature at the core of the foodstuff with a preliminarily calculated value ($T_y$) representing a maximum temperature value not to be exceeded by the detected temperature at the core of the foodstuff;
   a seventh step of, when, as a result of the comparison performed by said sixth step, the detected temperature at the core of the foodstuff is lower than the preliminarily calculated value ($T_y$), repeating said third through seventh steps; and
   an eighth step of, when, as the result of the comparison performed by the sixth step, the detected temperature at the core of the foodstuff is higher than the preliminarily calculated value ($T_y$), modifying the first pre-set value (K1) and repeating said first through eighth steps;
   wherein the preliminary calculated value ($T_y$) is a value resulting from a polynomial relation (A), in which an independent variable (x) is a measure of a time elapsed from a beginning of the pulling down of the temperature inside the foodstuff,
   wherein each modification of the first pre-set temperature value (K1) consists of a reduction of the first pre-set temperature value (K1) by a pre-defined, although not necessarily equal, increment from the respectively preceding value of the first pre-set temperature value (K1), and
   wherein the first pre-set temperature value (K1) is higher, by a pre-defined extent, than an initial set point value of a thermostat of the chilling compartment.

2. The method according to claim 1, wherein fixed parameters (a, b, c, . . . ) of the polynomial relation (A) are defined on a basis of constants that are determined experimentally.

3. The method according to claim 1, wherein, when the temperature at the core of the foodstuff is compared to the second pre-set value (H2) and the temperature at the core of the foodstuff is lower than the second pre-set value (H2), a reference temperature of the chilling compartment is pulled down to a pre-set value, at which any pulling down of the temperature is to end.

4. The method according to claim 1, wherein, when the temperature at the core of the foodstuff is compared to the second pre-set value (H2) and the temperature at the core of the foodstuff is lower than the pre-set value (H2), a reference temperature of the chilling compartment is pulled down to a pre-set value, at which any pulling down of the temperature is to end.

5. The method according to claim 2, wherein, when the temperature at the core of the foodstuff is compared to the second pre-set value (H2) and the temperature at the core of the foodstuff is lower than the second pre-set value (H2), a reference temperature of the chilling compartment is pulled down to a pre-set value, at which any pulling down of the temperature is to end.

* * * * *